United States Patent [19]

Giroux et al.

[11] Patent Number: 4,882,093

[45] Date of Patent: Nov. 21, 1989

[54] PROCESS AND INSTALLATION FOR THE TREATMENT OF SOLID ORGANIC WASTE CONTAMINATED BY TRITIUM

[75] Inventors: Pierre Giroux; Dominique Ochem; Jean-Claude Durand, all of Dijon, France

[73] Assignee: Commissariat a l'Energie Atomique, Paris, France

[21] Appl. No.: 241,622

[22] Filed: Sep. 8, 1988

[30] Foreign Application Priority Data

Sep. 9, 1987 [FR] France ................................ 87 12510

[51] Int. Cl.[4] .......................... G21F 9/02; G21F 9/08; G21F 9/14; C01B 5/00

[52] U.S. Cl. ........................................ 252/632; 55/68; 55/61; 252/630; 422/159; 422/903; 422/307; 422/288; 423/249; 423/647.7; 423/657; 423/580; 423/644; 423/645

[58] Field of Search .................... 252/630, 632; 55/66, 55/61, 68; 422/159, 903, 288, 307, 169; 423/249, 580, 647.7, 657, 644, 645

[56] References Cited

U.S. PATENT DOCUMENTS

| | | | |
|---|---|---|---|
| 3,937,649 | 2/1976 | Ridgely | 252/630 |
| 4,178,350 | 12/1979 | Collins et al. | 252/630 |
| 4,206,073 | 6/1980 | Hesky et al. | 252/630 |
| 4,424,903 | 1/1984 | Knieper et al. | 252/630 |
| 4,470,955 | 9/1984 | Collins et al. | 422/159 |
| 4,490,288 | 12/1984 | Weichselgartner | 252/630 |
| 4,619,809 | 10/1986 | Schluderberg | 376/402 |
| 4,657,747 | 4/1987 | Swansiger | 423/249 |

FOREIGN PATENT DOCUMENTS

| | | | |
|---|---|---|---|
| 0043401 | 1/1982 | European Pat. Off. | 252/630 |
| 204634 | 12/1986 | European Pat. Off. . | |
| 2434876 | 4/1975 | Fed. Rep. of Germany . | |
| 2279205 | 2/1976 | France . | |
| 2317740 | 2/1977 | France . | |
| 0073098 | 6/1975 | Japan | 252/630 |
| 0119297 | 7/1984 | Japan | 252/630 |
| 2188998 | 8/1987 | Japan | 252/630 |

*Primary Examiner*—Howard J. Locker
*Attorney, Agent, or Firm*—Oblon, Spivak, McClelland, Maier & Neustadt

[57] ABSTRACT

The invention relates to a process and an installation for the treatment of tritium-contaminated, solid organic waste. The waste is contacted with the steam in enclosure (1) for extracting the tritium in the steam and the steam is then condensed at (11 and 13) to recover the tritium from the waste in the form of tritiated water.

9 Claims, 1 Drawing Sheet

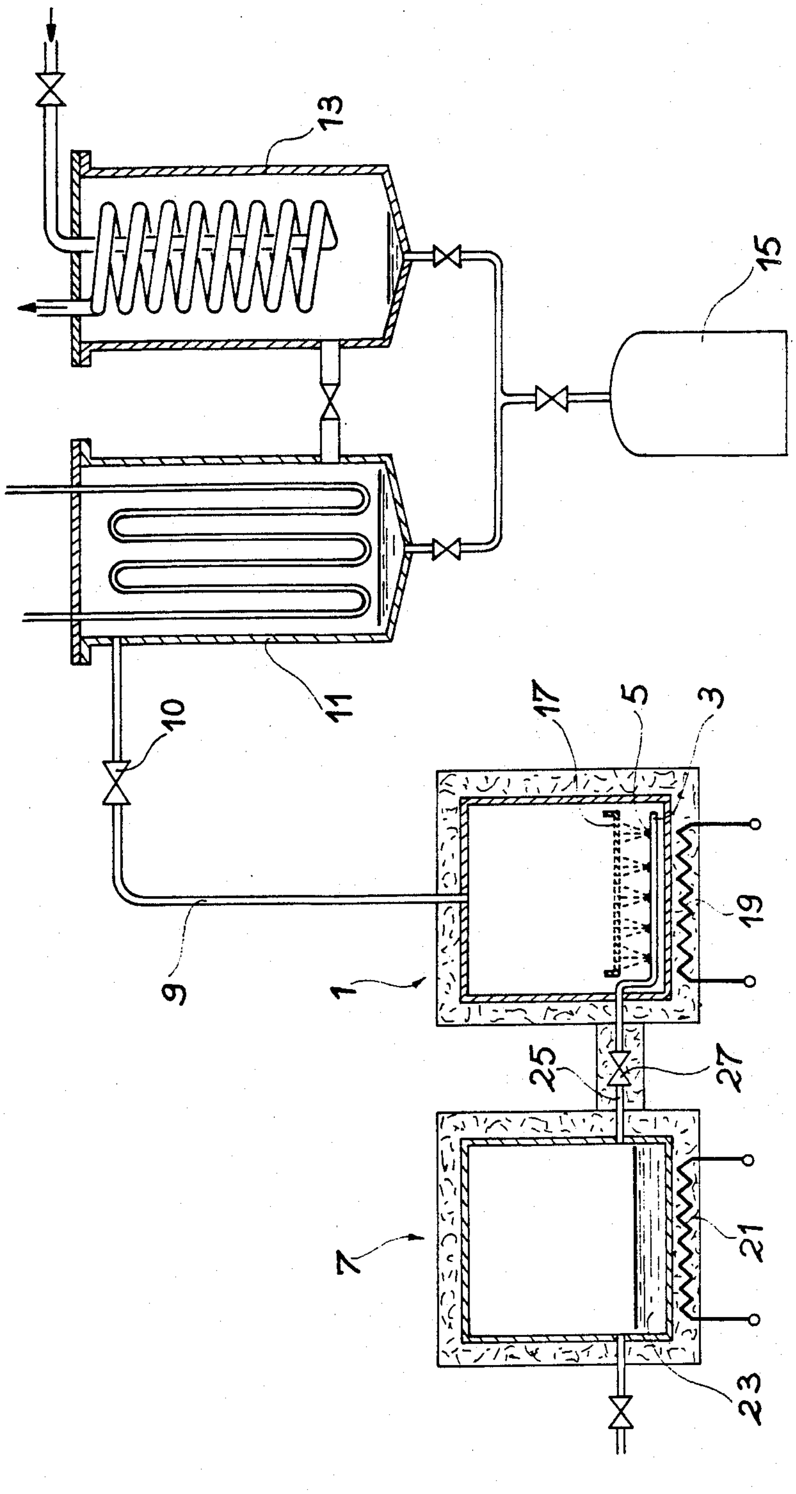
B. 9226

PROCESS AND INSTALLATION FOR THE TREATMENT OF SOLID ORGANIC WASTE CONTAMINATED BY TRITIUM

The present invention relates to a process for the treatment of solid organic waste contaminated by tritium. More specifically, it relates to a treatment process making it possible to reduce the tritium activity of waste to values below 10 Ci/t.

In installations for the treatment of tritiated gases and water, large amounts of tritium-contaminated organic waste is produced, e.g. glove box panels, gloves, vinyl, cotton and similar materials. In general, the tritium content of such waste reaches a few hundred Curies/-ton and generates a tritium degassing significantly complicating the control of the waste.

Processes have been sought making it possible to significantly reduce tritium degassing and therefore the activity of said waste to values below 10 Ci/t, namely 1 Ci/t.

The present invention specifically relates to a process for the treatment of solid organic waste contaminated by tritium making it possible to easily achieve this objective.

The inventive process for the treatment of solid organic waste contaminated by tritium is characterized in that said waste is contacted with steam under conditions such that in said steam is extracted at least part of the tritium present in the waste and in that the steam is then condensed to recover the tritium from the waste in the form of tritiated water.

According to a first embodiment of the inventive process, use is made of steam at a temperature T and a pressure P equal to the vapor tension $p_s$ of water at temperature T.

Under these conditions, the waste is saturated with water and dilution of the tritium takes place in the steam.

However, on operating under conditions with waste materials having different tritium contents, an equilibrium is reached and it may occur that the least contaminated waste is enriched with tritium during the steam contacting operation, whereas the most contaminated waste is depleted in tritium.

Moreover, according to a second preferred embodiment of the inventive process, use is made of dry vapor or steam at a temperature T and a pressure P below the vapor tension $p_s$ of water at temperature T. Under these conditions, the waste is dried and most of the tritium contained therein is extracted therefrom.

Thus, it has been found that the tritium present in solid waste is generally in the form of free tritiated water as a result of a spontaneous reaction of the tritium with the oxygen in the air, the activation energy of the reaction being supplied by the beta radiation of the tritium. Thus, the tritium is easily transformed into tritiated water. In the invention, said free tritiated water is extracted by contacting the waste with steam, which makes it possible to dry the waste and recover the tritium in the form of easily storable tritiated water.

Therefore the inventive process is very advantageous, because it can be easily performed in simple operations.

Preferably, contacting between the waste and the steam takes place under a pressure lower than atmospheric pressure in order to have more appropriate treatment conditions at not very high temperatures.

Thus, in the process according to the invention, the steam temperature T can be below the degradation, melting or decomposition temperature of the treated solid waste.

As organic waste is involved, it is normal to operate at temperatures below 80° C., e.g. by using dry steam at a pressure of 13.5 to 27 kPa (100 to 200 torrs).

By operating under these conditions, the free tritiated water present in the waste can be pumped and very satisfactory decontamination levels are obtained.

The present invention also relates to an installation for the treatment of solid organic waste contaminated by tritium and which comprises:

(a) a drying enclosure able to receive the solid waste to be treated, (b) means for heating the drying enclosure, (c) means for circulating within the drying enclosure steam at a temperature T and a pressure P at the most equal to the vapor tension $p_s$ of water at temperature T, (d) means for condensing the steam leaving the drying enclosure and (e) means for storing the thus condensed tritiated water.

Other features and advantages of the invention can best be gathered from reading the following description, which is given in a non-limitative, illustrative manner, with reference to the attached drawing diagrammatically showing an installation for the treatment of tritium-contaminated solid organic waste according to the invention.

The drawing shows that the installation comprises a solid waste drying enclosure 1 into which is introduced by means of a pipe 3 having orifices 5 steam from a steam generator 7. The steam passes out of the drying enclosure through pipe 9 equipped with a valve 10 and it is condensed in a condenser having two successive stages 11 and 13. It can then be stored in the form of tritiated water in reservoir 15.

The drying enclosure 1 is provided with a perforated grid 17 on which can be placed the waste to be treated. Grid 17 is located above pipe 5 provided with steam outlet orifices 3. Enclosure 1 is thermally insulated and has heating means 19 making it possible to maintain the desired temperature, i.e. temperature T.

The steam generator 7 is constituted by a thermally insulated enclosure provided in its lower part with heating means 21 for raising to temperature T the water 23 contained therein. A pipe 25 connects the steam space of generator 7 with the pipe 3 for introducing waste into enclosure 1and is provided with a regulating valve 27 making it possible to bring the pressure of the steam to the desired value, i.e. to a value generally below the vapor tension $p_s$ of the water 23 contained in steam generator 7. The two-stage condensor comprises a first stage 11 cooled by water at 15° C. and a second stage 13 cooled by liquid nitrogen.

The following procedure is used for treating a waste batch. Firstly the waste to be treated is placed on the perforated grid 17 of the drying enclosure 1 and then the pressure in the entire installation is brought to a value below atmospheric pressure using a group of vacuum pumps not shown in the drawing. The water of the steam generator 7 is then brought to the desired temperature T and the temperature of the drying enclosure 1 is regulated to the same temperature T. Valve 27 is then opened whilst regulating it in such a way as to lower the presure P of the steam introduced into the drying enclosure 1 to a value below the vapor tension $p_s$ of the water 23 of steam generator 7. Valve 10 of pipe 9 is also opened and steam is circulated into the drying enclosure 1 for the desired time for extracting the tritium from the waste. The steam is successively condensed in condensers 11 and 13 and is then stored in reservoir 15.

The following examples illustrate the results obtained by realizing the inventive process.

EXAMPLE 1

In this example, 25 kg of solid organic waste constituted by gloves containing 1% of tritiated water and having a tritium activity of 100 μCi/g are treated by the first embodiment of the inventive process, which consists of carrying out decontamination by isotopic dilution in steam.

In this case, the waste is introduced into enclosure 1, which has a volume of $2m^3$. The water of the steam generator 7 is then raised to 60° C. and the temperature of enclosure 1 is also regulated to 60° C. The pressure P of the steam introduced into enclosure 1 is 20 kPa (200 mbars). After introducing 2 liters of water into enclosure 1, 25 kg of waste containing less then 2 μCi/g of tritium are obtained, the activity of the water on leaving the condensers being 5 Ci/1.

EXAMPLE 2

This example makes use of the second embodiment of the inventive process, i.e. vapor drying of the waste in order to extract most of the tritium contained in the waste of the same type as in Example 1.

In this case, working takes place at a temperature of 60° C. under a pressure of 1 kPa (10 mbars) and in the enclosure are circulated 500 g, i.e. 0.5 l of water, which makes it possible to bring the activity of the 25 kg of waste to 2 μCi/g and collect at the outlet water with an activity of 20 Ci/1.

It can be seen that drying with unsaturated steam is more appropriate, because there is a good conduction of heat and a good autodiffusion of the tritiated water into the water.

We claim:

1. Process for the treatment of solid organic waste contaminated with tritium, comprising the steps of:
   contacting said waste with steam under conditions such that steam extraction of at least part of the tritium present in the waste occurs, and
   condensing said steam to convert the tritium from the waste to tritiated water.

2. Process according to claim 1, wherein said steam is at a temperature T and a pressure P equal to the vapor tension $p_s$ of water at temperature T.

3. Process according to claim 1, wherein said steam is dry steam at a temperature T and a pressure P below the vapor tension $p_s$ of water at temperature T.

4. Process according to either of the claims 2 and 3, wherein said temperature T is below the degradation or melting temperature of the treated solid organic waste.

5. Process according to claim 4, wherein said temperature T is below 80° C.

6. Process according to claim 3, wherein said pressure P of the steam is 13.5 to 27 kPa.

7. Process according to claim 1 wherein said contacting takes place under a pressure below atmospheric pressure.

8. Installation for the treatment of solid organic waste contaminated by tritium, comprising:
   (a) a drying enclosure able to receive the solid waste to be treated,
   (b) means for heating the drying enclosure,
   (c) means for circulating within the drying enclosure steam at a temperature T and a pressure P at the most equal to the vapor tension $p_s$ of the water at temperature T,
   (d) means for storing the thus condensed tritiated water.

9. Installation according to claim 8, wherein said means for circulating within the drying enclosure the steam at a temperature T and a pressure P comprise a steam generator, whose steam space is connected to the drying enclosure by a pipe provided with a pressure regulating valve, said pipe issuing into the drying enclosure beneath a grid supporting the waste to be treated.

* * * * *